ELECTRONIC CHARACTER SELECTING AND/OR PRINTING APPARATUS

Filed March 31, 1954 8 Sheets-Sheet 1

INVENTOR
Warren H. Bliss
BY Morris L. Rabkin
ATTORNEY

Nov. 11, 1958 W. H. BLISS 2,860,181

ELECTRONIC CHARACTER SELECTING AND/OR PRINTING APPARATUS

Filed March 31, 1954 8 Sheets-Sheet 2

INVENTOR
Warren H. Bliss
BY Morris A. Rabkin
ATTORNEY

INVENTOR
Warren H. Bliss
BY Morris A. Rabin
ATTORNEY

INVENTOR
Warren H. Bliss
BY Morris L. Rabkin
ATTORNEY

Nov. 11, 1958 W. H. BLISS 2,860,181

ELECTRONIC CHARACTER SELECTING AND/OR PRINTING APPARATUS

Filed March 31, 1954 8 Sheets-Sheet 5

INVENTOR
Warren H. Bliss
BY Morris L. Rabkin
ATTORNEY

INVENTOR
Warren H. Bliss
BY Morris L. Rabkin
ATTORNEY

INVENTOR
Warren H. Bliss
BY Morris A. Rabkin
ATTORNEY

ELECTRONIC CHARACTER SELECTING AND/OR PRINTING APPARATUS

Filed March 31, 1954 8 Sheets-Sheet 8

INVENTOR
Warren H. Bliss
BY Morris L. Rabkin
ATTORNEY

United States Patent Office 2,860,181
Patented Nov. 11, 1958

2,860,181

ELECTRONIC CHARACTER SELECTING AND/OR PRINTING APPARATUS

Warren H. Bliss, Princeton, N. J., assignor to Radio Corporation of America, a corporation of Delaware Application March 31, 1954, Serial No. 420,059
18 Claims. (Cl. 178—15)

The present invention relates to the selection of indicia including readable characters by code controlled means, and, more particularly, but not necessarily exclusively, to novel means for selecting indicia, such as numerals and letters of the alphabet and for presenting the selected indicia in a desired arrangement, such as, for example, in tabulated form to suit spaces in a blank or form for business use.

In accordance with the invention, an arrangement is provided for selecting and producing electron beam images of a numeral or a letter of the alphabet, for example. The selected image is shifted, preferably by electronic means, to suit a predetermined arrangement pattern. Initial production of the image of the numeral or the letter is obtained by a selector operated by code sensing means. Gating circuits are employed for arranging a group of selected numeral or letter images in tabulated order. The resulting arrangement of numeral or letter images is or may be recorded by photographic means, for example, or by other means. Suitable recording mediums may be employed which are sensitive to visible or invisible radiant energy. Photographic methods of recording are responsive to visible as well as invisible radiation and are, therefore, suitable. Radiation controlled electrostatic patterns may be employed for recording. Any suitable kind of code presenting medium may be used with the invention including transparent tape marked with code characters, punched tape or magnetic tape.

An object of the invention is to provide in a novel way for the selection of discrete indicia and for the arrangement of the selected indicia according to a predetermined pattern.

A further object is to provide novel means for the electronic selection of the positioning indicia by code controlled means.

A still further object is to provide, in a novel way for tabulating data.

Still another object is to provide a novel mode of controlling scanning deflection in a cathode ray tube in accordance with coded signals whereby to provide for tabulation of data.

This invention teaches a system for arranging items, each consisting of a group of electron beam images of selected indicia, in preselected positions in accordance with a coded input. A coincidence amplifier is connected to a pair of positioning multivibrators arranged in a binary chain having four stable states. The state or condition of the multivibrators controls the condition of four gates. A pulse applied to the first positioning multivibrator triggers it. The first multivibrator in being triggered back to its original state triggers the second. The multivibrators in the original state maintain a normally open gate opened, a signal diverting gate closed and gates to the positioning vertical and horizontal deflection circuits closed.

The coded input signals for the indicia included within any given item are preceded by three poistioning code combinations or signals. The first positioning code combination or priming signal indicates the termination of the previous item and the beginning of the new item. This priming signal is recognized by the coincidence amplifier which passes a signal to trigger the positioning multivibrators to this second state. This closes the normally open gate and opens the normally closed input signal diverting gate. This provides a path for positioning signals to be imposed directly upon the positioning multivibrators. A delays pulse from the coincidence amplifier resets the positioning horizontal and vertical deflection circuits to a starting point. A delayed pulse from the priming signal triggers the positioning multivibrators to their third state to open the gate to the vertical positioning deflection circuit.

The second positioning pulse passes through this opened gate to the vertical positioning deflection circuit to set the preselected positioning vertical deflection current for the ensuing item. A delay pulse derived from this second positioning signal triggers the positioning multivibrators to their fourth state to close the gate to the vertical positioning multivibrator, and to open the gate to the horizontal positioning deflection circuit.

The third positioning signal passes through this opened gate to the horizontal positioning deflection circuit where it sets the preselected horizontal positioning deflection current for the ensuing item. A delay pulse from the third positioning signal triggers the positioning multivibrators to their original state: to close the gate to the horizontal positioning deflection circuit, to close the input signal diverting gate and to reopen the normally open input signal gate. The code signals for producing electron beam images of the indicia included within the ensuing item will, therefore, pass through this normally open gate in the normal manner to produce the item in a horizontal line.

The three positioning code combinations or signals discussed above serve as tabulating signals in the manner indicated above and set forth more fully hereinafter. The positioning or tabulating signals cause operation of positioning or tabulating means so that the intelligence produced by the cathode ray beam falls in preselected locations.

Other objects and advantages of the invention will, of course, become apparent and immediately suggest themselves to those skilled in the art to which the invention is directed from a reading of the following specification in connection with the accompanying drawings in which.

Figure 3:
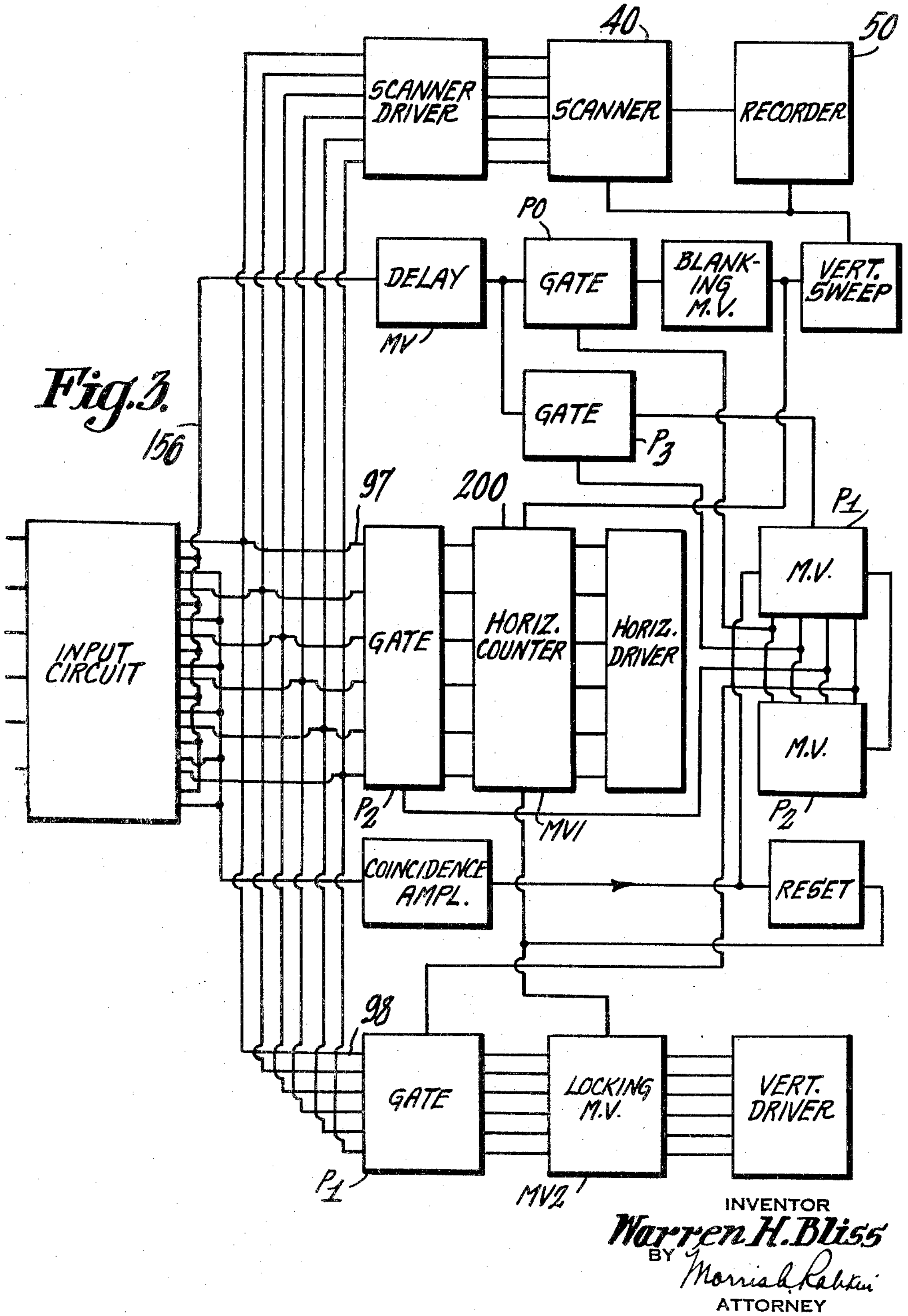
Fig. 3 is an overall block diagram of apparatus embodying the invention for selecting and tabulating numerals or characters or other indicia.

P1MV and P2MV gate control circuits appearing in block form in Fig. 3; and

Figure 6:
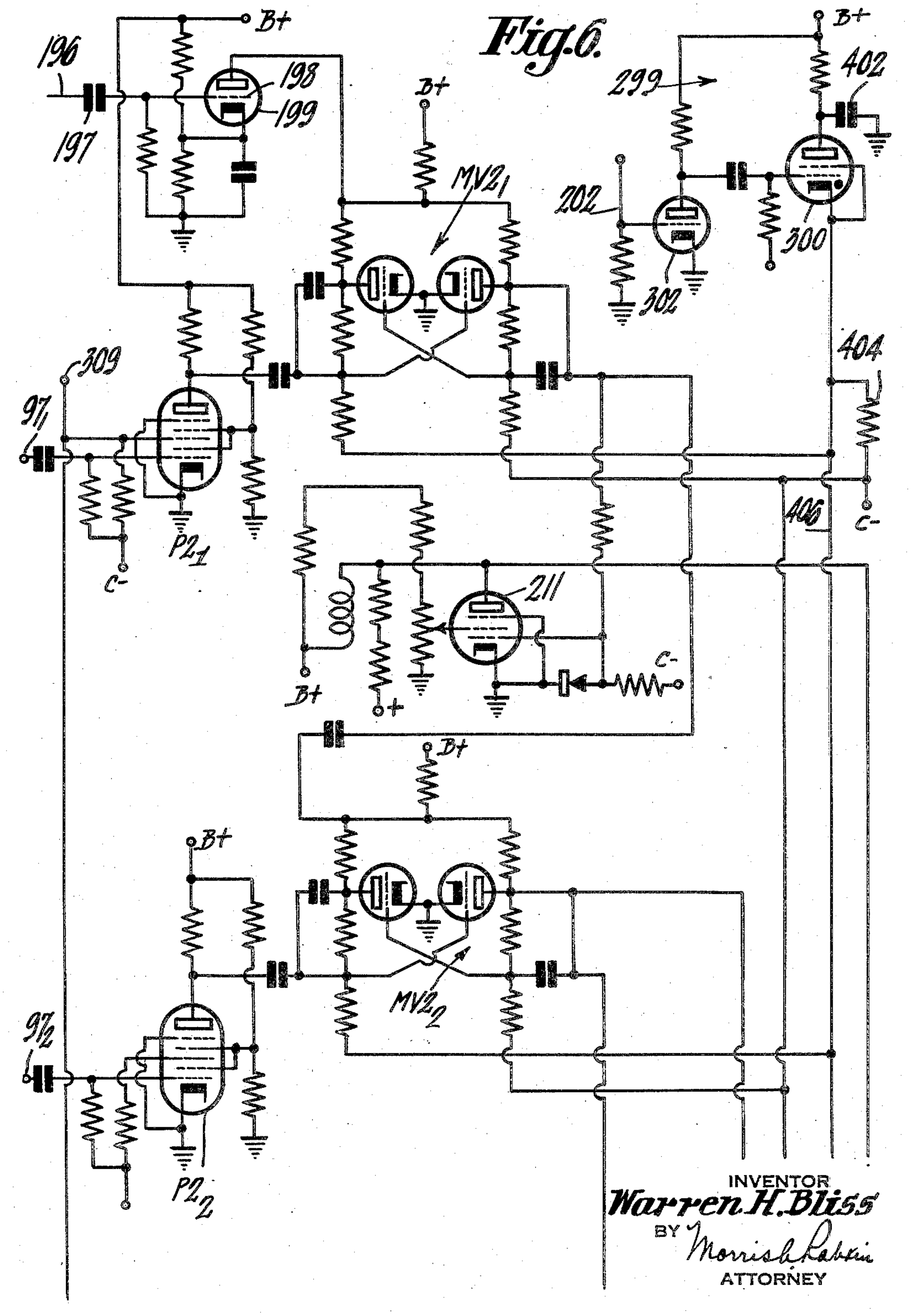
Figs. 6 and 6A are to be combined to show the horizontal positioning components of some of the units in Fig. 3 including the horizontal driver for presenting indicia in tabulated form for recording if desired.
Figure 6A:
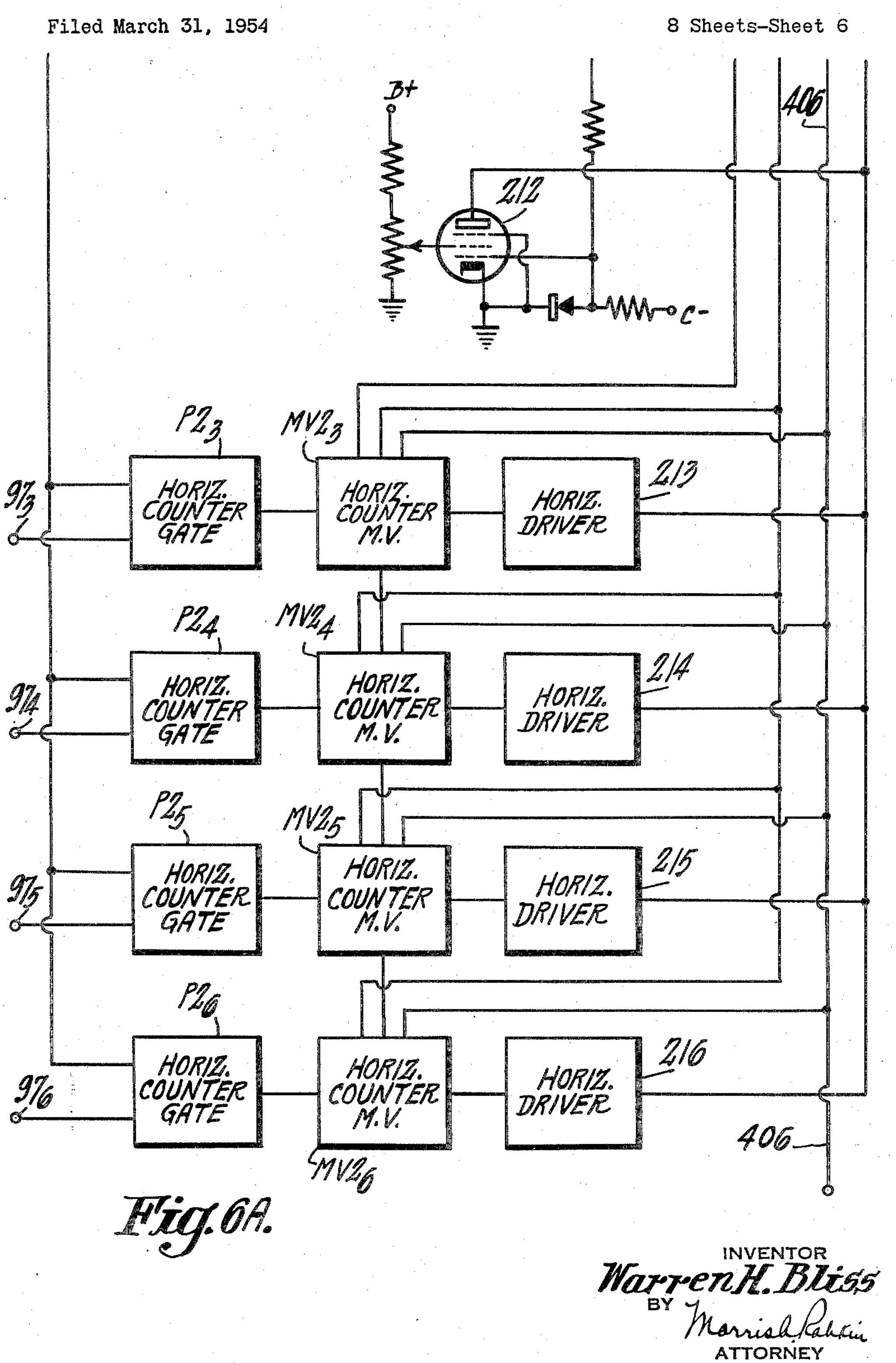
Figure 8:
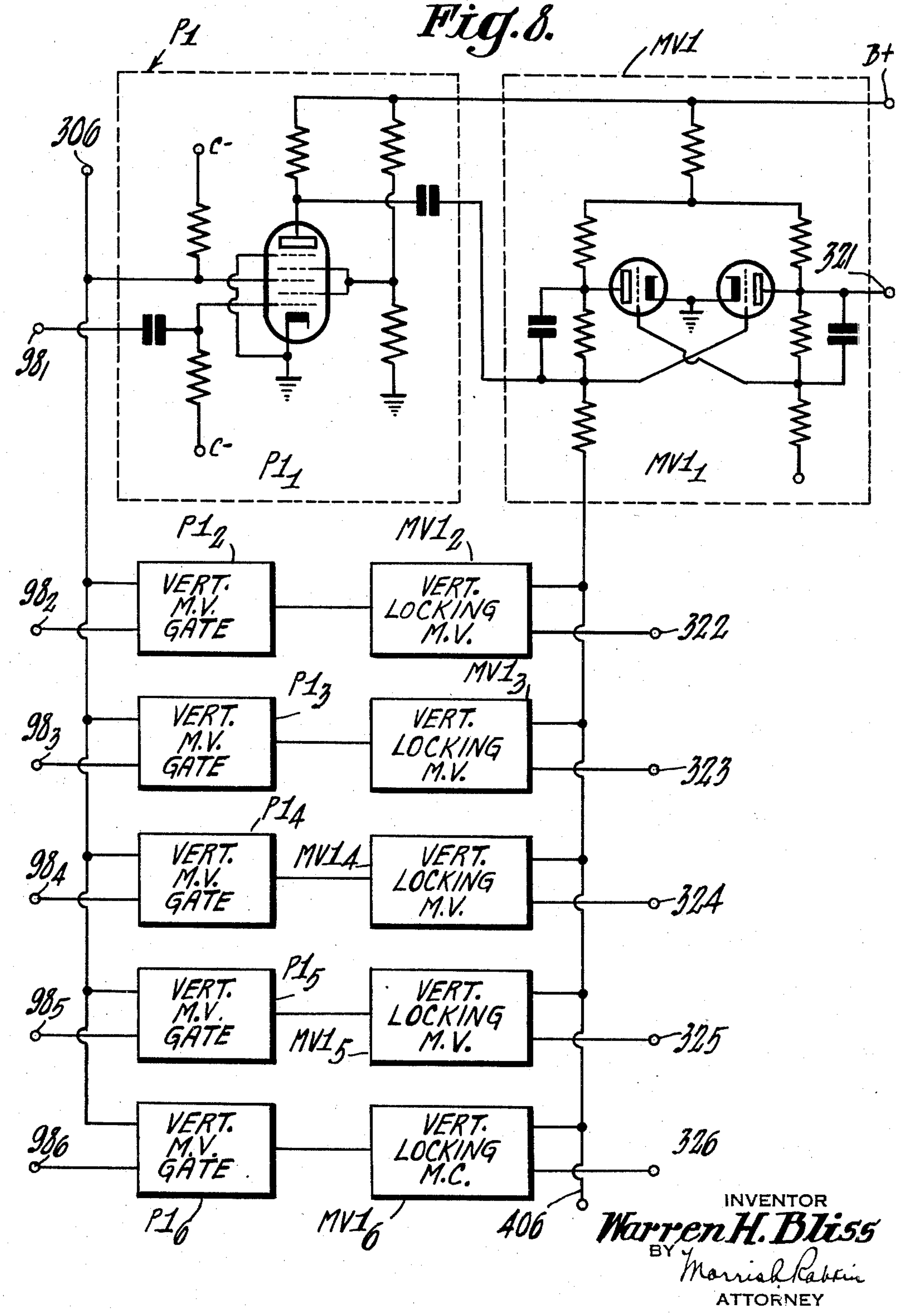

Fig. 8 is similar to Figs. 6 and 6A but shows the apparatus for obtaining vertical deflection in the unit for presenting indicia in tabulated form including the gate P1 and locking multivibrators shown in Fig. 3.

Fig. 3 is a compresensive showing of apparatus embodying this invention which selects indicia such, for example, as punctuation marks, numerals, and letters of the alphabet and arranges these indicia in a desired order of a tabulated pattern. In practicing the invention, numerals and letters of the alphabet may be selected and composed in the form of tabulated data. The parts of the apparatus indicated by blocks in Fig. 3 are illustrated by other figures of the drawing and will be described more in detail herein. These blocks are designated in Fig. 3 by the reference character assigned hereinafter to the principal component of the apparatus in the block. A detailed showing of the apparatus in each block is given in Figs. 4, 4A, 5, 6, 6A, 7, and 8. A portion of the apparatus shown herein is shown in Patent No. 2,762,862, granted to Warren H. Bliss on September 11, 1956. For the sake of completeness of disclosure, so much of the showing of the Bliss application just referred to will be reproduced herein in full detail as is necessary to an understanding of the present invention.

Figures 1, 2:
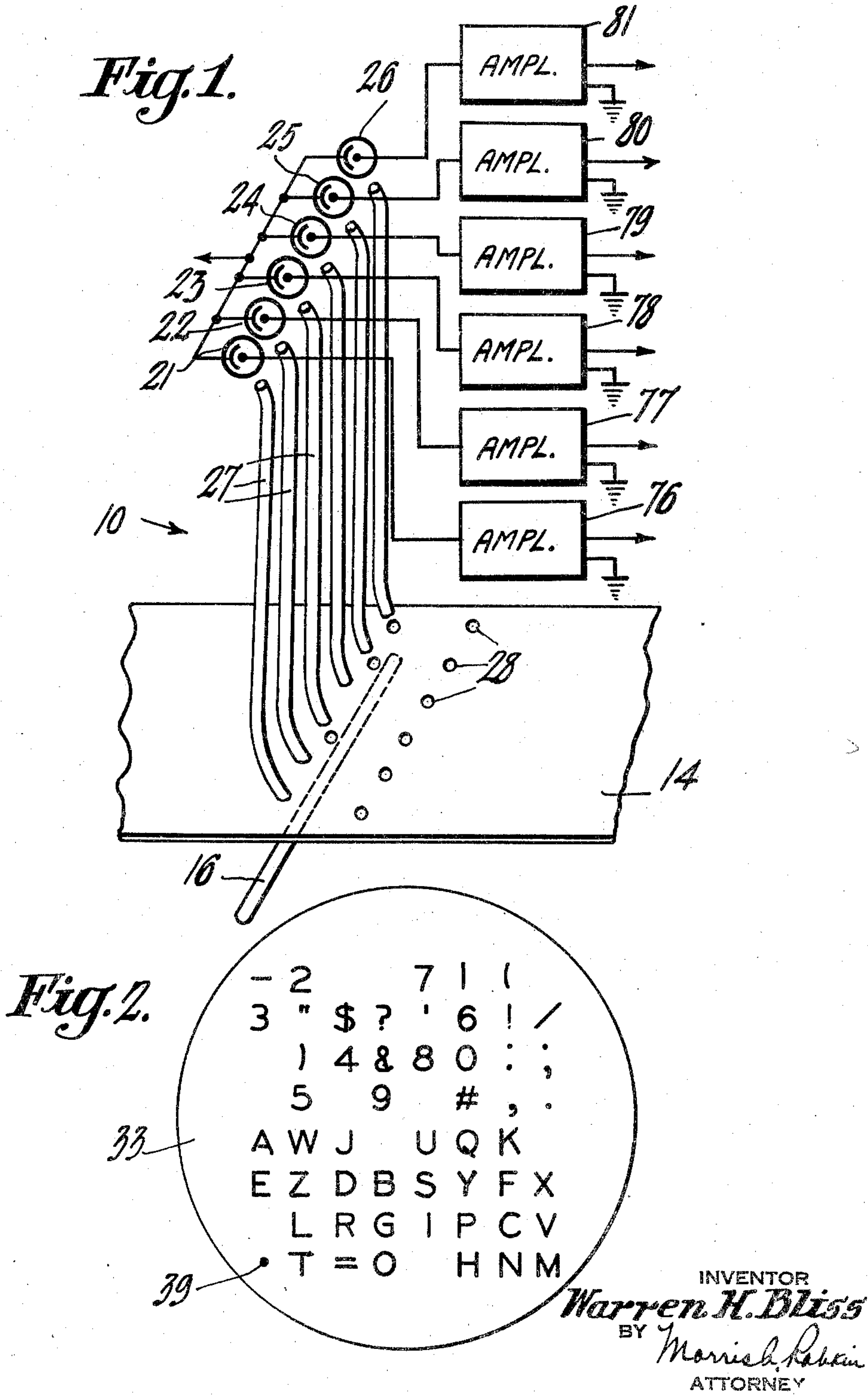
Fig. 1 is a schematic showing of an arrangement suitable for deriving code signals representing numerals or letters of the alphabet or other indicia.
Fig. 2 is a view of the character defining means of the invention representing characters disposed for selection.

Reference numeral 10 (Fig. 1) designates a code reader or senser which may be of any desired kind or type for handling a code bearing medium. In the illustrative example, the code senser 10 operates with punched tape 14 bearing code punchings in accordance with a six-unit binary code. The apparatus of Fig. 1 may, if desired, include features shown in Zworykin Patent No. 1,753,961, granted April 8, 1930. A patent to Cremer 1,828,556, dated October 20, 1931, also discloses a code senser or transmitter suitable for purposes of carrying out this invention.

It will be understood that magnetic tape may be employed which traverses or is traversed by six magnetic heads. As this description proceeds, the slightly changed arrangement necessary for operation with magnetic tape will be pointed out.

An elongated light source 16 is provided for projecting light through the punched holes 28 in the tape onto a set of six phototubes 21 to 26. Suitable means, such as quartz rods 27, are provided to guide the light from a hole in the tape onto its corresponding phototube. It will be understood that any suitable means may be employed for moving the tape either intermittently or continuously. It will be also understood that, as pointed out above, magnetic tape may be employed with magnetic pickup devices. The tape 14 may also be transparent with opaque tape markings thereon. Since the selection and scanning of each letter is triggered individually, apparatus embodying the invention will operate at any speed from its maximum or top value down to a few characters per second. The tape drive speed is not critical and does not bear any synchronous relationship to operation of the apparatus.

Figure 4:
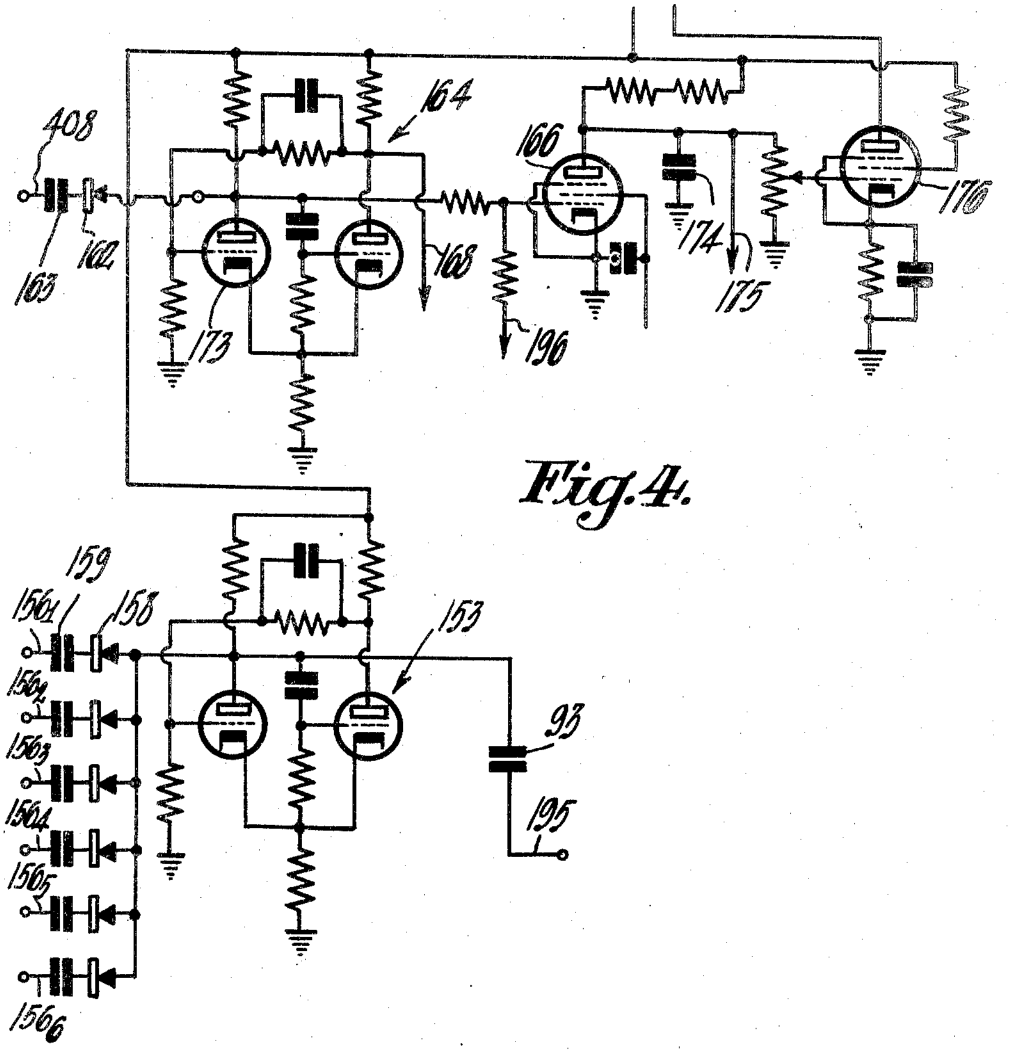
Fig. 4 is a schematic diagram of parts of the circuit including the delay multivibrator and the blanking multivibrator shown in Fig. 3.
Figure 4A:
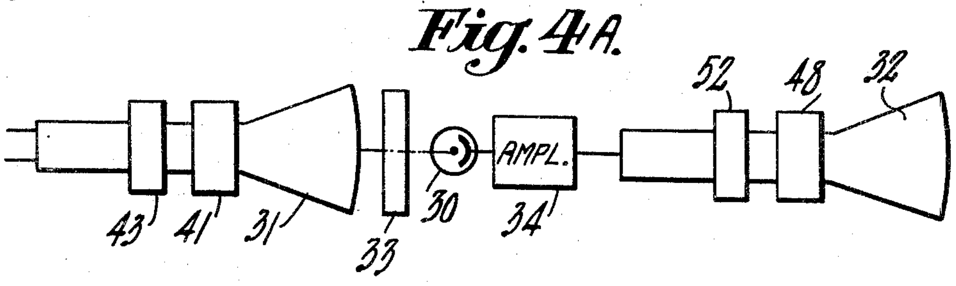
Fig. 4A is a schematic showing of a scanner cathode ray tube and a recorder cathode ray tube embraced in the showing of Fig. 3.

The receiving and recording arrangement of Fig. 3 includes in the scanner and recorder designated respectively 40 and 50 two flying spot cathode ray tube scanners or kinescopes 31 and 32 shown in Fig. 4A. The principle of the flying spot scanner is shown in Patent No. 2,104,066, granted to V. K. Zworykin on January 4, 1938. A slide or mask 33 (Figs. 2 and 4A) is interposed between the flying spot tube scanner 31 and a phototube 30 (Fig. 4A) which may be considered as being included in the block 40 of Fig. 3. The phototube 30 provides an input to kinescope 32 through amplifier 34. The slide 33 may, if desired, be in the form of a mask applied directly to the face of the kinescope 31. The indicia may be opaque on a transparent field, or may be transparent on an opaque field. The mask is divided into squares which are selectively scanned by the raster scanning means of the kinescope 31. In the illustraive example sixty-four squares, or other appropriate areas, may be selected by combinations of a six-unit binary code. The square inscribed with the letter G is, for example, reached by deflecting the beam four units horizontally and one unit vertically from the "rest" position of the beam. The rest position of the beam is designated as point 39 on Fig. 2. In the rest position, however, the beam is extinguished. Properly applied deflection currents or voltages normally maintain the beam in the rest position, and steady deflection components to select a square on the mask 33 vary these steadily applied deflection components. Alternatively, and more simply, the well-known gun structure of the kinescope 31 may be located so as to direct the beam to the portion of the screen occupied by the square representing the rest position in the absence of coordinate deflection voltages or currents. A deflection yoke is indicated by reference character 41. This yoke may be of the kind fully described in Patent No. 2,428,947 granted to C. E. Torsch on October 14, 1947. The coordinate deflection currents may be superimposed on the windings of the yoke 41. In the illustrative example, an auxiliary yoke 43 is provided which surrounds the yoke 41 or lies adjacent to it. The electron beam of the cathode ray tube 31 is deflected over a scanning pattern or raster, this raster having an area sufficient only to cover one of the selected indicia squares of the mask 33. The scanned raster may be similar to the raster produced in a television tube, but it need not be interlaced.

The kinescope 32 is provided with a deflection yoke 48 which is or may be similar to the yoke 41 described in connection with the kinescope 31. The yoke 48 receives deflection currents as shown in detail by Figs. 6 and 6A. A suitably disposed auxiliary yoke 52 is provided for the kinescope 32. It will be understood, in the description which is to follow, that the terms vertical and horizontal are used herein merely to designate components of scanning and do not necessarily have any relationship to the position in space of the target faces of the kinescopes 31 and 32. Recordings may be obtained by any radiation sensitive apparatus or process from the face of the kinescope 32.

Referring to Figs. 1, 3, 4, 4A and 5 of the drawing, a detailed description will now be given of the arrangement for producing deflection of the beam in the kinescope 31 so as to effect character selection and character production. This is or may be accomplished as disclosed in the Bliss application, Serial No. 213,389, referred to above.

The phototube 26, for example, provides a signal to the phototube amplifier 81 of the group of amplifiers 76 to 81. This signal is applied by way of a coupling condenser 83 to a single shot multivibrator 99. The phototubes 25, 24, 23, 22 and 21 are similarly and respectively connected through channels schematically shown as rectangles designated 59, 60, 61, 62 and 63. The single shot multivibrators included in these channels are connected respectively to driver tubes designated respectively by reference characters 65, 66, 67, 68, 69 and 70. The channels 59 to 63 embrace the same equipment as that shown in channel 58. The single shot multivibrator 99, as well as those in the channels 59 to 63 are conventional and develop square top pulses whose length is adjusted in accordance with the maximum speed of operation of the system. The output from the multivibrator 99 is taken through a glow tube 102 and applied to the grid 104 of the deflection driver tube 65. The grid 104 is connected through resistor 92 to the negative source of biasing potential 91. A diode 106, which may be a crystal rectifier, has for its purpose to help hold the plate current of driver tube 65 constant during conduction time. The input conditions are such that the grid of the tube 65, as well as the tubes 66 to 70, could be driven positive, but the diodes conduct and hold the grids at essentially cathode potential. The portion of the circuit including the glow tube 102 and rectifier 106 is shown enclosed within rectangle 2. Similar portions of the circuits for the other five channels are represented by rectangles 3 to 7.

The screen grid 108 of the tube 65 is connected to the sliding tap of a potentiometer 109 so that the level of output current in the tube 65 may be set. The current level of the tube 65 may be such that it represents one unit of horizontal deflection in the horizontal deflection coil 100 in the yoke 41. The current level of the tube 66 may be set to provide two units of vertical deflection by the adjustment of the screen grid resistor 110. The output current for the tube 67 may be set to provide four units of deflection by the screen grid resistor 112. The voltage at the screen grid of the tube 68 may be controlled by a potentiometer 114 so that its current output represents one unit of deflection. The screen grid resistor 116 for the tube 69 may be set so that it provides two units of deflection, and the screen grid resistor 117 for tube 70 may be set so that it provides four units of deflection. Suitable centering means for the horizontal deflection coil 100 are indicated by variable resistors 118 and 119. Vertical centering for the vertical deflection coil 122 is provided by the variable resistor 124. The junction of the resistors 119 and 124 is connected to a source of high positive voltage. In the illustrative example, this is +550 volts and the terminal 84 is connected to a +250 volt source. The coil 122 forms the vertical deflecting means of the yoke 41.

In addition to locating the beam in the kinescope 31 on the portion of the beam target corresponding to a selected letter, it is necessary to deflect the beam vertically and horizontally over the relatively small area assigned to each character or letter. In the illustrative arrangement, shown more in detail by Fig. 5, horizontal sweep within the character area is provided by the auxiliary deflecting coil 43 previously referred to as an auxiliary horizontal yoke or coil. Horizontal scanning deflection within the character area on the tube face is generated under control of a free running multivibrator 131 of a well-known type. It is to be noted that the horizontal sweep for the character area scanned need not be synchronized with the code reading apparatus. Deflection for scanning the character area by the kinescope 32 is also controlled from the multivibrator 131. The output wave from the multivibrator 131 is applied to the grid 133 of a discharge tube 136. The tube 136 allows a condenser 138 to produce the horizontal letter sweep or sawtooth wave. The condenser 138 charges from the source connected to terminal 84 and is discharged during conductive time of the tube 136. The produced sawtooth is applied to the grid 141 of the driver tube 74 so that this tube drives a sawtooth of current through the coil 43.

Return line blanking during letter area scan in the kinescope 31 is provided by a blanking tube 143. Blanking pulses are applied to the grid of the tube 143 and the output is taken across a cathode resistor 144 and applied through lead 145 to the cathode of the kinescope 31.

Vertical deflection over the character area in the kinescopes 31 and 32 is provided under control of a delay single shot or single stroke multivibrator 153. This multivibrator 153 has its delay characteristic set to hold off the vertical letter sweep or scan until the letter selection deflection currents have been established in the yoke coils. The multivibrator 153 is triggered from the single shot multivibrator 99 over a conductor $156_1$. This connection includes a rectifier 158 and a coupling condenser 159. The negative going output pulses from the multivibrator 99 are differentiated, the rectifier 158 passing the first short negative going pulse to trip the multivibrator and suppressing the short positive going pulse. Similar connections are made to the single shot multivibrators in the rectangle designated 59, 60, 61, 62 and 63 through leads $156_2$ to $156_6$.

The output of the delay multivibrator 153 as code input signals are continuously provided, is a series of positive going pulses. The duration of these pulses are determined by the restoring time of the multivibrator as is well known in the art. Multivibrator 153 is coupled to a second single shot multivibrator 164 via gate P0 through lead 408, condenser 163 and rectifier 162. This serves to provide blanking pulses and controls operation of the vertical discharge tube 166. The rectifier 162 suppresses the initial short positive going pulse permitting the following negative going pulse to trip the multivibrator 164 after a time interval determined by the operation of the multivibrator 153. An output of the multivibrator 164 appears as a positive pulse in the lead 168. This positive pulse is applied to the grid of the kinescope 31 to unblank it during letter sweep time.

A negative going pulse of blanking time duration from the plate of the left-hand tube 173 of the multivibrator 164 is applied to cut off conductivity in the tube 166 to charge the condenser 174 to provide a sawtooth wave for vertical letter scan. The current output of the vertical scanning driver tube 176 is added to the vertical selecting current flowing in the vertical deflection coil 122. The selected letters may be arranged in a row on the face of the kinescope 32 by the letter counter schematically shown in Fig. 3. Incoming pulses, one per letter originating from the delay multivibrator 153 may be applied through the blanking multivibrator 164 of Fig. 4 over a conductor 196 to the grid of tube 199 of Fig. 6 which may serve as a driver for a six stage binary letter counter chain indicated generally by reference character 200. This counter chain may use conventional locking type multivibrators with a total capacity of 64 counts. Electronic counters employing multivibrators are discussed in an article entitled "Electronic Digital Counters" by Warren H. Bliss, appearing in the April 1949 issue of Electrical Engineering. Each multivibrator may control a component of horizontal deflection through its associated driver tube. Since the deflection current components are also weighed on a binary scale basis, the total current used for deflection may be proportional to the count. This causes the reproduced letters to be uniformly spaced in a line when this deflection current is applied to a horizontal deflection coil (not shown) located in the yoke 48 of Fig. 4. The delayed pulse output from multivibrator 113 is applied to gates P3 and P0 through a condenser 93 and lead 195.

Vertical letter sweep for the deflection coil (not shown) in the yoke 48 may be provided from the sawtooth generating system shown in Fig. 4 via lead 175. Horizontal deflection for letter scan in the kinescope 32 may be provided by pulses derived from the grid of discharge tube 136.

To arrange or compose various items or groups of preselected characters in preselected positions on the screen of the reproducing cathode ray tube 32, further circuit arrangements shown in Figs. 6, 6A, 7 and 8 must be utilized. This invention teaches a method and means for automatically positioning the items to be reproduced utilizing a three character positioning signal preceding each item to be reproduced. This positioning signal controls the placement of the item on the reproducing cathode ray tube screen and, hence, on a corresponding printed form.

In Fig. 6 is shown a schematic diagram of the horizontal positioning system for an item to be reproduced. Tube 199 may serve as the driver for the letter-counter 200. A pulse from the delay multivibrator 153 of Fig. 4 may be applied via the gate P0 and the blanking multivibrator 164 through conductor 196 and condenser 197 to the grid 198. In Figs. 6 and 6A is shown a schematic diagram of the horizontal positioning counter chain which may be made up of multivibrators $MV2_1$ to $MV2_6$ together with the horizontal positioning drivers 211, 212, 213, 214, 215, and 216. The first section of a six-section gate P2 which may be designated as $P2_1$ is shown connected to the horizontal positioning multivibrator $MV2_1$. The second section of gate which may be designated as $P2_2$ is shown connected to horizontal positioning multivibrator $MV2_2$. The other sections of gate P2 which may be designated by the rectangles $P2_3$, $P2_4$, $P2_5$, and $P2_6$, are connected to their respective horizontal positioning multivibrators and drivers. A reset circuit 299 utilizes a gas tetrode 300 which has an amplifier triode 302 connected in its grid circuit. The reset circuit is connected to the various vertical and horizontal positioning multivibrators through lead 406. The various sections of the gate P2 derive their respective inputs from the respective single shot multivibrators through leads $97_1$ to $97_6$.

Figure 7:
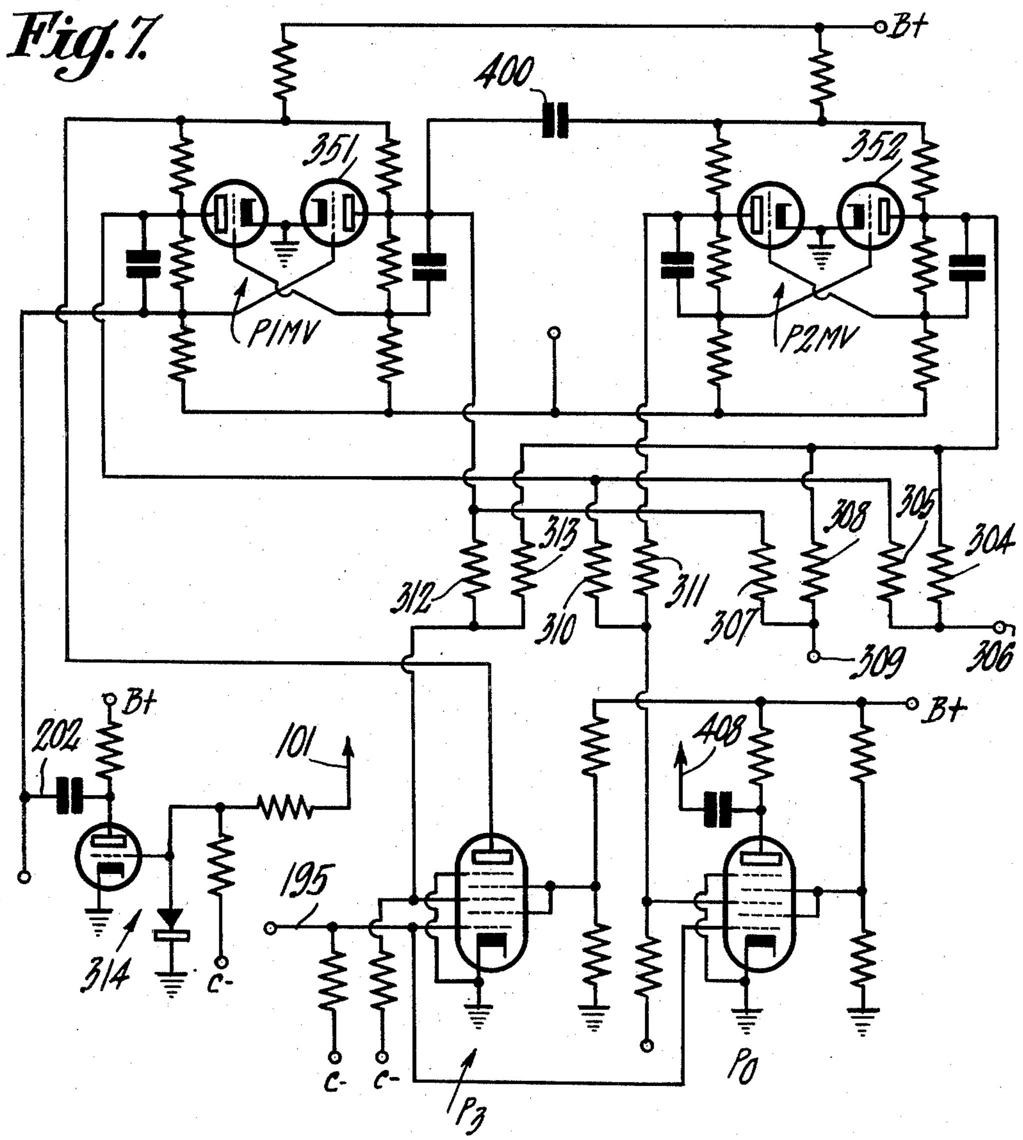
Fig. 7 shows details of two of the gate circuits.

In Fig. 7 are shown the two position control multivibrators P1MV and P2MV. They are connected to the six section gates P1 and P2. They are connected through resistors 304 and 305 to terminal 306 which is connected to the six section gate P1 which controls the vertical positioning. They are connected through resistors 307 and 308 to terminal 309 which is connected to the other six section gate P2 which controls the horizontal positioning. The positioning multivibrators P1MV and P2MV are connected through resistors 310 and 311 to gate P0 and are connected also through resistors 312 and 313 to gate P3. A coincidence amplifier 314 is shown with its output connected to positioning multivibrator P1MV. The coincidence amplifier derives its input through lead 101 which is connected by way of crystal diodes 280 to 285 to single shot multivibrators 58 to 63, respectively. These diodes have a common biasing resistor 286 connecting to a source of positive potential.

In Fig. 8 is shown gate P1 coupled to vertical positioning multivibrator MV1. Gate P1 is a six section gate which is made up of sections $P1_1$, $P1_2$, $P1_3$, $P1_4$, $P1_5$, and $P1_6$. The gate sections are respectively connected to the vertical positioning locking multivibrators $MV1_1$, $MV1_2$, $MV1_3$, $MV1_4$, $MV1_5$, and $MV1_6$. Gate P1 derives an input from leads $98_1$, $98_2$, $98_3$, $98_4$, $98_5$ and $98_6$ connecting to the single shot multivibrators. The output from the vertical positioning locking multivibrators connected from terminals 321, 322, 323, 324, 325 and 326 to the corresponding vertical positioning drivers (not shown). The locking multivibrators and vertical drivers produce steps of vertical deflection in the recorder tube and operate in a somewhat similar manner to the letter counter 200 with its horizontal drivers. The vertical control circuit, however, does not operate as a counter.

The positioning circuit operates in the following manner. The code combinations on the input tape for any given item to be reproduced will be preceded by the three positioning code combinations. The first of these is the priming signal indicating the termination of a previous item and the beginning of a new item. The priming signal is accepted by the coincidence amplifier 314 to the exclusion of all other code combinations and it initiates the action of the position control system by opening gate P1. The second positioning character passes through gate P1 to set up the desired combination on locking multivibrators $MV1_1$ to $MV1_6$. These in turn supply control potentials to the vertical drivers to establish and hold the vertical deflection current. After this is set up, gate P1 is closed and gate P2 is opened so that the third positioning code combination may be passed to the letter counter. This sets up the desired combination of locking multivibrators $MV2_1$ to $MV2_6$ in the counter. This establishes and holds the proper horizontal deflection current through the respective drivers 211 to 216. When this has been done all the gates return to normal.

With these two deflection currents primarily having been provided for the recorder tube, the characters or signals following on the tape will produce the ensuing characters of the item in a horizontal line. The primary deflection currents provided by the three positioning characters will, therefore, predetermine the location of the item on the recorder tube screen.

Figure 5:
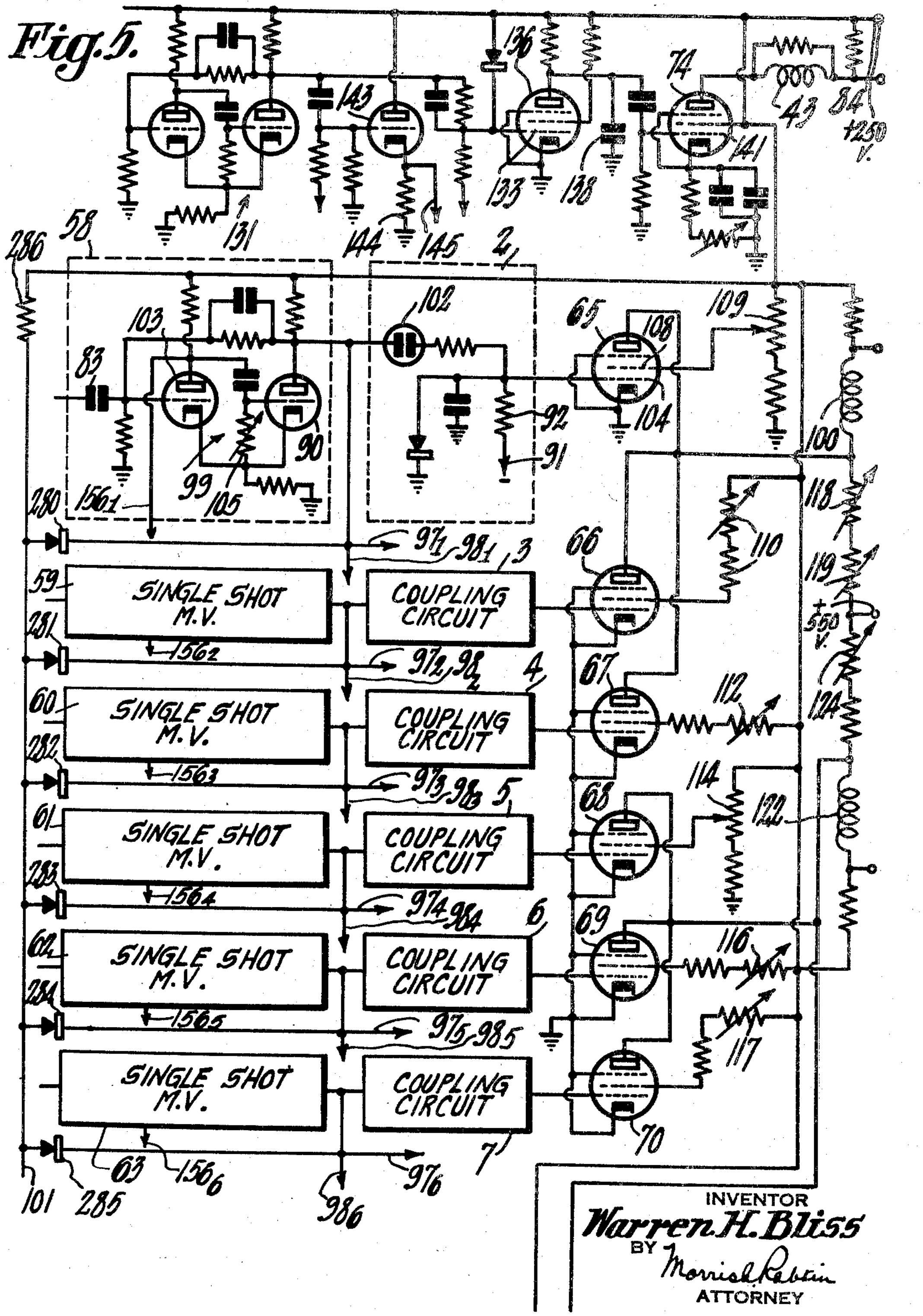
Fig. 5 is a schematic diagram of some of the units shown by Fig. 3 for selecting indicia including the scanner driver.

Referring to Fig. 5, one of the input single shot multivibrators 58 is shown in detail. This circuit is normally in its stable state with conduction in the right hand triode 90. An input pulse from the first channel on the tape will cause the multivibrator to trip over to its unstable state of conduction through the left hand triode 103. It remains in this unstable state a short interval of time which may be adjusted by the variable resistor 105. This time interval is just long enough to scan and to produce one letter on the recorder tube screen.

For each of the 64 possible code combinations provided by a six unit binary code, a different combination of the single shot multivibrators 58 to 63 is tripped on. The code combination which trips all six single shot multivibrators "on" at once may be utilized as the priming or first positioning control signal. When this occurs, all six of the crystal diodes 280 to 285 in the outputs of the single shot multivibrators will simultaneously have their cathodes raised in potential. This will bring the control grid of the coincidence amplifier 314 through lead 101 above its cut off point. This allows conduction through coincidence amplifier 314 which produces a coincidence pulse output on lead 202. Lead 202 couples this pulse into the input of P1MV positioning multivibrator and the reset circuit 299. The delay multivibrator 153 operates on all code combinations and produces a delayed output pulse which occurs later than the coincidence pulse. This delayed output pulse is coupled to the blanking multivibrator 164 which holds back the start of the vertical letter sweep until the blanked scanner tube beam reaches the selected letter position. At the end of this short delay interval, the blanking multivibrator 164 stops conduction through vertical discharge tube 166 to initiate the vertical letter scan through driver tube 176. The free running horizontal letter sweep multivibrator 131 produces pulses for the horizontal letter sweep generator and for horizontal blanking in the reproducer as well as in the scanner.

A basic feature of the position control system is provided between two locking multivibrators shown in Fig. 7 designated as P1MV and P2MV. They are pulse actuated and control the four gates which are designated as P0, P1, P2 and P3. Normally, P1MV and P2MV have their right hand triode sections 351 and 352 conducting. This "off" condition of both multivibrators holds gate P0 open through resistors 310 and 311. This maintains one of the control grids of the gate tube P0 at zero potential. Under this condition, the delay multivibrator output pulses are passed on to the blanking multivibrator 164 for normal letter reproducing operation.

When the priming or first positioning signal occurs, the coincidence amplifier 314 passes a trigger pulse to P1MV to turn it "on." This immediately closes gate P0 and through resistors 312 and 313 opens gate P3. The output pulse of the delay multivibrator 153, which is delayed behind the coincidence pulse is passed through gate P3 via condenser 103 and lead 101 instead of through gate P0 and trips multivibrator P1MV "off." As P1MV goes "off" it turns P2MV "on" by way of condenser 400. This opens gate P1 so that it is ready to transmit the second positioning signal.

The gates may be of the pentagrid type. When either the No. 1 or No. 3 control grid is held below the rated cutoff potential, a positive pulse applied to the other control grid has no effect. This is the closed condition. When the No. 3 grid is brought up to zero or cathode potential as is done according to the teachings of this invention, a positive pulse applied to the No. 1 grid will produce a negative output pulse at the plate of the gate tube.

Referring to Fig. 8, the details of the gate P1 and the locking multivibrators which are connected to the vertical position drivers are shown. Gate P1 is a six section gate. After it has been opened as described previously, the locking multivibrators $MV1_1$ to $MV1_6$ are ready to receive pulses from the input single shot multivibrators 58 to 63. When the second positioning code combination arrives on the tape, it trips the corresponding combination of single shot multivibrators. These multivibrators are of the type having two stable positions. Initially they are all in the "off" or normal position with the right hand triode sections conducting. When a combination of them is turned on, they will remain in the "on" condition until reset. In this "on" condition of the locking multivibrators $MV1_1$ to $MV1_6$ the corresponding vertical position drivers will be held "on" to establish a vertical deflection current in the recording tube yoke 48. The second positioning code combination will, therefore, determine the vertical position on the recording tube screen where the ensuing item is to appear.

Immediately after this action, the output pulse from the delay multivibrator 153 will pass through gate P3 to again trigger the first position multivibrator P1MV. This causes both P1MV and P2MV to be turned "on." The condition of the gates is thus modified to the following conditions. Gate P1 is closed. Gate P2 is open. Gate P0 remains closed and gate P3 remains open.

The third positioning code combination will actuate another combination of the single shot multivibrators. They will pass appropriate pulses to the letter counter multivibrators $MV2_1$ to $MV2_6$ through "open" gate P2. This establishes the proper recorder horizontal deflection current through the horizontal position drivers 211 to 216 for positioning the ensuing item. This initial predetermined deflection current holds until further information is provided.

Referring to Fig. 7, the delay pulse provided by the third positioning code combination goes through gate P3 to trip multivibrator P1MV again. This sets multivibrator P1MV back to "off" or normal. This passes a pulse to multivibrator P2MV to return it to "off" or normal. With both the positioning multivibrators back to normal, all four gates are also brought back to normal with gate P0 open and gates P1, P2 and P3 closed.

The next code combinations which arrive on the tape will produce letters on the recorder tube screen in a horizontal line. The starting position of these letters, however, will have been established by the three positioning code combinations which preceded them. When all the letters or characters included within a given item have been reproduced a new set of positioning code combinations will be received to establish the starting position for the next ensuing item.

Another element is required to complete the operating cycle. This element is a reset means for returning the locking multivibrators and the letter counter to an initial or starting point. This is necessary to prepare these elements to receive and be actuated by the ordinary characters included within the item. Referring to Fig. 6, this is accomplished by means of a reset gas tetrode 300. The output of the coincidence pulse amplifier 314 (Fig. 7) is applied to the control grid of the reset tube through lead 202. The reset tube fires to discharge condenser 402 through resistor 404. The resulting high amplitude pulse is applied to the appropriate control grids on all the locking multivibrators to turn them "off" through lead 406.

What is claimed is:

1. In combination with an image producing system for the selective production of electron beam images of indicia in item combinations in response to coded signals provided by an input source, said coded signals including image producing and item tabulating signals, apparatus for arranging said items in preselected positions comprising image positioning means, means connecting said image positioning means to said image producing system for providing successive tabulating pulses to said image positioning means from said image producing system in response to said image producing signals and signal diverting means being disposed between said input source and said image producing system and being connected to said image positioning means for directly providing thereto said coded tabulating signals to set the starting position of the ensuing item.

2. In combination with an arrangement for selective production of electron beam images of indicia in item combinations in response to coded signals provided by an input source, apparatus for arranging said items in preselected positions comprising an image positioning system being connected to said input source for receiving therefrom said coded signals, said input source being characterized by providing separate item positioning signals and separate image producing signals, and means for discriminating between and selectively diverting said signals being disposed between said input and said image producing arrangement and between said input and said image positioning system for channeling said positioning signals to said positioning system for setting the starting position of the ensuing item.

3. In combination with an image producing system for selective production of electron beam images of indicia in item combinations in response to coded signals provided by an input source, apparatus for arranging said items in preselected positions comprising image positioning means, said input source being characterized by providing image producing signals and item tabulating signals, means connecting said image positioning means to said image producing system for providing successive tabulating pulses to said image positioning means from said image producing system in response to said image producing signals, signal diverting means being disposed between said input source and said image producing system being connected to said image positioning system, and means for discriminating between said producing and said tabulating signals being operatively associated with said signal diverting means for selectively channeling said tabulating signals directly to said image positioning circuit to set the starting position of the ensuing item.

4. In a system for selective production of electron beam images of indicia in item combinations in response to coded signals provided by an input source, apparatus for arranging said items in preselected positions comprising horizontal and vertical electron beam positioning deflection means being connected to said input source for receiving therefrom said coded signals, said input source being characterized by providing separate item tabulating signals and separate image producing signals, means for diverting said signals being disposed between said input and said image producing system and between said input and said horizontal and vertical electron beam positioning deflection means, means for recognizing said tabulating signals being connected to said input source and being operatively associated with said signal diverting means for channeling said tabulating signals directly to said horizontal and vertical electron beam positioning deflection means to preset an initial beam positioning deflection for the ensuing item.

5. The invention as set forth in claim 4 wherein said horizontal positioning deflection means is connected to said image producing system to receive successive tabulating pulses from said image producing system in response to said image producing signals to horizontally space successive images in a line.

6. The invention as set forth in claim 5 in combination with a reset means being disposed to receive signals from said signal recognizing means, and said reset means being operatively associated with said horizontal and vertical positioning deflection means to restore both said deflection means to a starting condition in preparation for receiving said positioning signals for said ensuing item.

7. A system for selective production of electron beam images of indicia in item combinations in response to coded signals provided by an input source; said system comprising an image producing system and positioning means for arranging said items in preselected positions; said positioning means comprising horizontal and vertical deflection means; said deflection means and said image producing system being connected to said input source for receiving therefrom said coded signals; a gate control means; a plurality of gates disposed in operative relationship with said gate control means; said gates being disposed for isolating said input source from said deflection means, from said image producing system and from said gate control means; means whereby said input source provides item positioning signals and image producing signals; means for discriminating between said signals being disposed for receiving signals from said input source and being operatively associated with said gate control means for triggering said gate control means to close said image producing system gate and to open said gate isolating said gate control means in response to a positioning signal; and said gate control means including means for opening said gates isolating said deflection means in response to succeeding positioning signals from said input source to allow said positioning signals to preset an initial beam positioning deflection for the ensuing item.

8. The invention as set forth in claim 7 wherein said discriminating means includes reset means, said reset means being operatively associated with said horizontal and vertical positioning deflection means for providing a signal to restore both said deflection means to a starting condition in preparation for receiving said positioning signals for said ensuing item.

9. The invention as set forth in claim 7 wherein said gate control means includes means for reopening said image producing system gate and for closing the others of said plurality of gates in response to a subsequent positioning signal.

10. The combination as set forth in claim 7 wherein said input source includes a means providing delayed pulses in response to said positioning signals, said delayed pulse means being disposed for providing delay pulses to said gate control means in response to and in cooperation with said positioning signals to trigger said gate control means to selectively operate said gates.

11. The invention as set forth in claim 7 wherein said gate control means is comprised of a binary chain of multivibrators having a plurality of stable states.

12. The invention as set forth in claim 7 wherein said gate control means includes a binary chain of multivibrators having discrete stable states, and said multivibrators being operatively disposed for selectively operating said gates in various combinations corresponding to its stable states.

13. The invention as set forth in claim 7 wherein said gate control means includes a binary chain of multivibrators having discrete stable states, and said multivibrators being operatively disposed for selectively operating said gates in various combinations corresponding to its stable states, said multivibrators providing means: for maintaining said image producing system gate opened in one of said stable states, for maintaining said gate isolating said gate control means opened in others of said stable states and for maintaining said deflection means gates opened during some of these said other stable states to allow said positioning signals to preset an initial beam positioning deflection for the ensuing item.

14. The invention as set forth in claim 7 wherein said input source includes means for providing a delay pulse in response to each positioning signal, said signal discriminating means including means for providing an initial positioning signal for triggering said gate control means to open said gate isolating said gate control means from said input source, said gate control means including additional means for being triggered in response to further positioning signals and corresponding delay pulses to open said deflection means gates to permit said further signals to preset an initial beam positioning deflection for the ensuing item.

15. A system for selective production of electron beam images of indicia in item combinations in response to coded signals provided by an input source; said system comprising an image producing system and positioning means for arranging said items in preselected positions; said positioning means comprising horizontal and vertical deflection means; said deflection means and said image producing system being connected to said input source for receiving therefrom said coded signals; a chain of multivibrators having various discrete stable states; a plurality of gates disposed in operative relationship with said multivibrator chain; means for selectively operating said gates in accordance with the state of said multivibrator chain; said gates being disposed for isolating said input source from said deflection means, from said image producing system and from said multivibrator chain; means whereby said input source provides item positioning signals and image producing signals, means for discriminating between said signals being disposed for receiving signals from said input source and being operatively associated with said multivibrator chain for triggering said gate control means to close said image producing system gate and to open said gate isolating said multivibrator chain means in response to a positioning signal; reset means disposed for receiving a positioning signal from said discriminating means and operatively associated with said deflection means to restore said deflection means to a starting condition; and said multivibrator chain including means for opening said gates isolating said deflection means in response to succeeding positioning signals from said input source to preset initial beam positioning deflection for the ensuing item.

16. A system for positioning item combinations of images of indicia produced by a system for the selective production of electron beam images of said indicia comprising an input source providing coded input signals including image producing signals and item positioning signals; an array of horizontal positioning means; an array of vertical positioning means; a plurality of gates; a gate control means; said input source being connected to said image producing system, to said gate control means, to said array of horizontal positioning means and to said array of vertical positioning means through said plurality of gates; said plurality of gates providing means for selectively isolating said image producing system, said gate control means, said array of horizontal positioning means and said array of vertical positioning means from said input source; means coupling said array of horizontal positioning means to form a counter chain of a portion of said array of horizontal positioning means; driver means connecting said counter chain to said image producing system to provide successive horizontal positioning pulses to said counter chain from said image producing system in response to said coded image producing signals; said counter chain providing means for horizontally spacing successive images in response to said successive positioning pulses; coincidence means for discriminating between said image producing and said item positioning signals being connected between said input source and said gate control means; said gate control means being operatively associated with said plurality of gates for selectively operating said gates in predetermined combination; said gate control means including means for selectively operating said gates to isolate said image producing system from said input source and for connecting said input source directly to said array of horizontal positioning means and to said array of vertical positioning means; said array of horizontal positioning means and said array of vertical positioning means including means for presetting an initial beam positioning deflection for the ensuing item in response to said item positioning signals; and reset means connecting said coincidence means to said array of horizontal positioning means and to said array of vertical positioning means for restoring said array of horizontal and vertical positioning means to a starting condition in preparation for receiving said item positioning signals for said ensuing item.

17. A system for positioning item combinations of images of indicia produced by a system for the selective production of electron beam images of said indicia comprising an input source providing coded input signals including image producing signals and item positioning signals; an array of horizontal positioning multivibrators; an array of vertical positioning multivibrators; a plurality of gates; a binary chain of locking multivibrators having various stable states to control said gates; said input source being connected through said plurality of gates to said image producing system, to said binary chain of multivibrators, to each of said array of horizontal positioning multivibrators and to each of said array of vertical positioning multivibrators; said plurality of gates providing means for selectively isolating said image producing system, said binary chain of multivibrators, each of said array of horizontal positioning multivibrators and each of said array of vertical positioning multivibrators from said input source; means coupling said array of horizontal positioning multivibrators to form a counter chain of said array of horizontal positioning multivibrators; driver means connecting said counter chain to said image producing system to provide successive horizontal positioning pulses to said counter chain from said image producing system in response to said coded image producing signals; said counter chain providing means for horizontally spacing successive images in response to said successive positioning pulses; coincidence amplifier means for recognizing said item positioning signals being connected between said input source and said binary chain of multivibrators; said binary chain of multivibrators being operatively associated with said plurality of gates for selectively operating said gates in predetermined combinations in accordance with the state of said binary chain of multivibrators; said binary chain of multivibrators through the range of its various states providing signals for operating combinations of said gates to isolate said image producing system from said input source and for connecting said input source directly to each of said array of horizontal positioning multivibrators and to each of said array of vertical positioning multivibrators; each of said array of horizontal positioning multivibrators and each of said array of vertical positioning multivibrators being connected to deflection drivers for presetting an initial beam positioning deflection for the ensuing item in response to said item positioning signals; and reset means connecting said coincidence amplifier means to each of said array of horizontal positioning multivibrators and to each of said array of vertical positioning multivibrators for restoring each of said array of horizontal and vertical positioning multivibrators to a starting condition in preparation for receiving said item positioning signals for said ensuing item.

18. A system for positioning item combinations of images of indicia produced by a system for the selective production of electron beam images of said indicia comprising an input source providing coded input signals including image producing signals and three item positioning signals; said item positioning signals including a priming signal, a second positioning signal and a third positioning signal; an array of horizontal positioning multivibrators; an array of vertical positioning multivibrators; a plurality of gates; a binary chain of locking multivibrators having four stable states to control said gates; a delay pulse means connecting said input source to both said image producing system and said binary chain of multivibrators; said input source being connected through said plurality of gates to said image producing system, to said binary chain of multivibrators, to each of said array of horizontal positioning multivibrators and to each of said array of vertical positioning multivibrators; said plurality of gates providing means for selectively isolating said image producing system, said binary chain of multivibrators, each of said array of horizontal positioning multivibrators and each of said array of vertical positioning multivibrators from said input source; means coupling said array of horizontal positioning multivibrators to form a counter chain of said array of horizontal positioning multivibrators; driver means connecting said counter chain to said image producing system to provide successive horizontal positioning pulses to said counter chain from said image producing system in response to said coded image producing signals; said counter chain providing means for horizontally spacing successive images in response to said successive positioning pulses; coincidence amplifier means for recognizing said priming signal being connected between said input source and said binary chain of multivibrators to relay said priming signal to said binary chain to trigger said binary chain to its second state; said binary chain of multivibrators being operatively associated with said plurality of gates for selectively operating said gates in predetermined combinations in accordance with the state of said binary chain of multivibrators; said binary chain of multivibrators in its second state providing a signal to close the gate to isolate said image producing system from said input source and to connect said input source directly to said binary chain of multivibrators; said delay pulse means providing a delayed pulse to trigger said binary chain of multivibrators to its third state in response to said priming signal to open the gate to each of said vertical positioning multivibrators; said second positioning signal passing through said gate to each of said vertical positioning multivibrators; said delay means providing a delayed pulse to said binary chain of multivibrators in response to said second positioning signal to trigger said binary chain to its fourth state to close said gate to each of said array of vertical positioning multivibrators and to open the gate to each of said array of horizontal positioning multivibrators; said third positioning signal passing through said opened gate to each of said array of horizontal positioning multivibrators; said delay means providing a delayed pulse in response to said third positioning signal to open said gate to said image producing system and close the others of said gates to produce said ensuing item of indicia in a horizontal line; each of said array of horizontal positioning multivibrators and each of said array of vertical positioning multivibrators being connected to deflection drivers for presetting an initial beam positioning deflection for the ensuing item in response to said item positioning signals; and reset means connecting said coincidence amplifier means to each of said array of horizontal positioning multivibrators and to each of said array of vertical positioning multivibrators for restoring each of said array of horizontal and vertical positioning multivibrators to a starting condition in response to said priming signal in preparation for receiving said item positioning signals for said ensuing item.

References Cited in the file of this patent

UNITED STATES PATENTS

| | | |
|---|---|---|
| 2,379,880 | Burgess | July 10, 1945 |
| 2,594,731 | Connolly | Apr. 29, 1952 |
| 2,596,741 | Tyler | May 13, 1952 |
| 2,679,035 | Daniels et al. | May 18, 1954 |
| 2,735,956 | McNaney | Feb. 21, 1956 |
| 2,736,770 | McNaney | Feb. 28, 1956 |
| 2,754,360 | Dersch | July 10, 1956 |
| 2,755,996 | Williams | July 24, 1956 |
| 2,784,251 | Young | Mar. 5, 1957 |